United States Patent
Hung et al.

(10) Patent No.: US 8,798,285 B2
(45) Date of Patent: Aug. 5, 2014

(54) ELECTRONIC DEVICE AND METHOD THEREOF FOR IDENTIFYING ELECTRONIC ACCESSORY

(75) Inventors: Ching Chung Hung, Taoyuan County (TW); Hsiu Hung Chou, Taoyuan (TW); Chia Wei Hsu, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 436 days.

(21) Appl. No.: 12/909,163

(22) Filed: Oct. 21, 2010

(65) Prior Publication Data

US 2011/0093643 A1    Apr. 21, 2011

(30) Foreign Application Priority Data

Oct. 21, 2009 (TW) ................................. 98135695 A (51) Int. Cl.
*H04R 1/10* (2006.01)
*H04B 3/00* (2006.01)
(52) U.S. Cl.
USPC .................................. 381/74; 381/77; 381/78
(58) Field of Classification Search
USPC .................................. 381/77–79, 74; 700/94
See application file for complete search history.

(56) References Cited

U.S. PATENT DOCUMENTS

| | | | |
|---|---|---|---|
| 3,289,016 A | 11/1966 | Bloom et al. | |
| 6,038,457 A | 3/2000 | Barkat | |
| 6,856,046 B1 | 2/2005 | Scarlett et al. | |
| 7,241,179 B2 | 7/2007 | Chennakeshu | |
| 7,697,697 B2 | 4/2010 | Su et al. | |
| 2003/0144040 A1 | 7/2003 | Liu et al. | |
| 2004/0041911 A1* | 3/2004 | Odagiri et al. | 348/207.1 |
| 2004/0080440 A1 | 4/2004 | Su et al. | |
| 2004/0198442 A1 | 10/2004 | Chan et al. | |
| 2004/0204185 A1 | 10/2004 | Snyder et al. | |
| 2004/0230733 A1 | 11/2004 | Yan | |
| 2005/0078935 A1 | 4/2005 | Sun | |

(Continued)

FOREIGN PATENT DOCUMENTS

| | | |
|---|---|---|
| CN | 1980488 A | 6/2007 |
| CN | 101137211 A | 3/2008 |

(Continued)

OTHER PUBLICATIONS

Machine Translation of 20040003256.*

(Continued)

*Primary Examiner* — Ahmad Matar
*Assistant Examiner* — Katherine Faley
(74) *Attorney, Agent, or Firm* — Lowe Hauptman & Ham, LLP (57) ABSTRACT

An electronic device includes a jack, a voltage processing unit, a measuring unit, a data transmission unit, and a switching unit. The jack receives a plug of an electronic accessory and has first and second contact terminals. The voltage processing unit detects whether a voltage is present at the second contact terminal when a second contact of the plug is in contact with the second contact terminal. The measuring unit measures a parameter resulted from the contact of the first contact terminal with a first contact of the plug. The data transmission unit transmits to or receives from the electronic accessory a data signal through the first contact terminal. The switching unit selectively connects the first contact terminal electrically to the data transmission unit or measuring unit according to whether the voltage is present or not.

9 Claims, 5 Drawing Sheets

(56) References Cited

U.S. PATENT DOCUMENTS

| | | |
|---|---|---|
| 2008/0164994 A1 | 7/2008 | Johnson et al. |
| 2008/0270647 A1 | 10/2008 | Shih et al. |
| 2008/0318629 A1* | 12/2008 | Inha et al. ............ 455/557 |
| 2009/0179768 A1 | 7/2009 | Sander et al. |

FOREIGN PATENT DOCUMENTS

| | | |
|---|---|---|
| GB | 2443976 A | 11/2006 |
| KR | 2004-0003256 A | 1/2004 |
| KR | 2004-0078518 A | 9/2004 |
| KR | 2004-0103201 A | 12/2004 |
| TW | 561760 B | 11/2003 |
| TW | 583863 B | 4/2004 |
| TW | 589527 B | 6/2004 |
| TW | 594544 B | 6/2004 |
| TW | 200700995 | 6/2005 |
| TW | 200944034 A | 10/2009 |
| TW | I229478 | 10/2010 |
| WO | 01-65827 A2 | 9/2001 |
| WO | 01-84809 A2 | 11/2001 |
| WO | 2004-001552 A2 | 12/2003 |
| WO | 2004-057711 A1 | 7/2004 |
| WO | 2005-004148 A1 | 1/2005 |
| WO | 2006045617 A2 | 5/2006 |
| WO | 2008064514 A1 | 6/2008 |

OTHER PUBLICATIONS

Extended European Search Report for Application No. 10188396.5 dated Jun. 14, 2011.

* cited by examiner

ELECTRONIC DEVICE AND METHOD THEREOF FOR IDENTIFYING ELECTRONIC ACCESSORY

CROSS REFERENCE TO RELATED APPLICATION

This application claims the priority benefit of Taiwan Patent Application Serial Number 098135695 filed Oct. 21, 2009, the full disclosure of which is incorporated herein by reference.

BACKGROUND OF THE INVENTION

1. Field of the Invention

The invention relates to an electronic device, and more particularly, to an electronic device and method thereof for identifying electronic accessory.

2. Description of the Related Art

Nowadays, many portable electronic devices, such as mobile phones and PDAs are all equipped with a 2.5 or 3.5 mm standard audio jack so as to output audio data signals to earphones or speakers. Furthermore, most of the portable electronic devices are usually equipped with such as USB jacks so as to be able to share data with computers by USB transmission cables. Besides, some of the electronic devices are also provided with AC jacks so as to be able to be charged with AC adapters.

However, to arrange so many jacks on an electronic device is not only unattractive but also inconvenient for users.

SUMMARY OF THE INVENTION

An electronic device capable of identifying different kinds of electronic accessories is provided.

In one embodiment, the electronic device of the present disclosure is connectable with an electronic accessory and includes a jack, a voltage processing unit, a measuring unit, a first data transmission unit and a switching unit. The jack of the electronic device is adapted to receive an insertion of a plug of the electronic accessory and has at least one first contact terminal and a second contact terminal that are adapted to be in contact with at least one first contact and a second contact of the plug, respectively. The voltage processing unit is adapted to detect whether a voltage is present at the second contact terminal of the jack when the second contact of the plug is in contact with the second contact terminal of the jack. The measuring unit is adapted to measure a first parameter resulted from a contact of the first contact terminal of the jack with the first contact of the plug. The first data transmission unit is adapted to transmit to or receive from the electronic accessory a first data signal through the first contact terminal of the jack when the jack receives the insertion of the plug. The switching unit is adapted to selectively connect the first contact terminal of the jack electrically to the first data transmission unit or the measuring unit according to whether the voltage is present or not.

According to the present disclosure, the electronic device further includes an insertion detecting unit adapted to detect whether the plug of the electronic accessory is inserted into the jack, wherein the voltage processing unit detects whether the voltage is present or not when the insertion detecting unit detects an insertion of the plug into the jack.

According to the present disclosure, the electronic device further includes a second data transmission unit adapted to transmit to or receive from the electronic accessory a second data signal through the second contact terminal of the jack when the jack receives the insertion of the plug.

According to the electronic device of the present disclosure, the switching unit connects the first contact terminal of the jack electrically to the measuring unit when the voltage processing unit detect the voltage is not present at the second contact terminal of the jack.

In one embodiment of the present disclosure, the first data transmission unit is a USB transmission unit. The first contact terminal of the jack is switched by the switching unit from being in electrical connection with the measuring unit to being in electrical connection with the USB transmission unit when the first parameter measured by the measuring unit has a first predetermined value.

In one embodiment of the present disclosure, the first data transmission unit is an audio output unit adapted to output an audio data signal to the electronic accessory. The first contact terminal of the jack is switched by the switching unit from being in electrical connection with the measuring unit to being in electrical connection with the audio output unit when the first parameter measured by the measuring unit has a second predetermined value.

In one embodiment of the present disclosure, when the first parameter measured by the measuring unit has a second predetermined value, the second contact terminal of the jack is switched by the switching unit from being in electrical connection with the voltage processing unit to being in electrical connection with the measuring unit so that the measuring unit measures a second parameter resulted from a contact of the second contact terminal of the jack with the second contact of the plug.

According to the electronic device of the present disclosure, the second data transmission unit is an audio receiving unit adapted to receive an audio data signal through the second contact terminal of the jack. The second contact terminal of the jack is switched by the switching unit from being in electrical connection with the measuring unit to being in electrical connection with the audio receiving unit when the second parameter measured by the measuring unit has a third predetermined value.

According to the electronic device of the present disclosure, the second data transmission unit is a video output unit adapted to output a video data signal through the second contact terminal of the jack. The second contact terminal of the jack is switched by the switching unit from being in electrical connection with the measuring unit to being in electrical connection with the video output unit when the second parameter measured by the measuring unit has a fourth predetermined value.

The present disclosure further provides a method of identifying an electronic accessory for an electronic device, wherein the electronic device includes a voltage processing unit, a measuring unit, a battery and a jack having at least one first contact terminal and one second contact terminal. The method of the present disclosure includes the steps of: detecting whether a voltage is present at the second contact terminal of the jack by the voltage processing unit; and electrically connecting the first contact terminal of the jack to the measuring unit and measuring a first parameter resulted from a contact of the first contact terminal of the jack with the plug of the electronic accessory by the measuring unit when the voltage processing unit detects the voltage is not present at the second contact terminal of the jack.

According to the method of the present disclosure, the parameter, such as voltage, resistance or current may be measured to identify what kind of electronic accessory is inserted into the audio jack. Accordingly, the object of coupling various kinds of electronic accessories with the electronic device to execute the functions thereof may still be achieved by equipping with only one audio jack. Furthermore, the switching unit is switched in such a manner that the contact terminals of the audio jack are in electrical connection with the voltage processing unit and USB transmission unit 224 before the audio jack is inserted with a plug. This may protect other elements in the electronic device from an electrical surge when an AC adapter or USB plug coupled with electrical power is inserted into the audio jack of the electronic device.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1A:
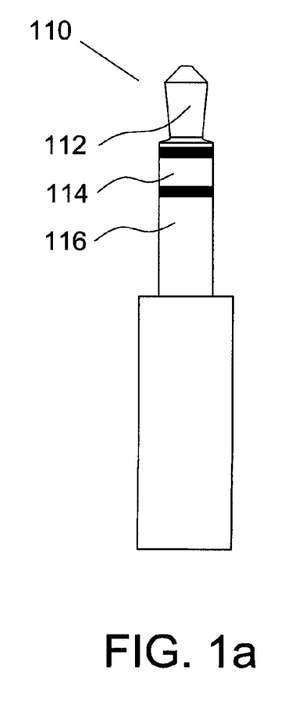
FIG. 1a is a standard plug with three contacts.
Figure 1B:
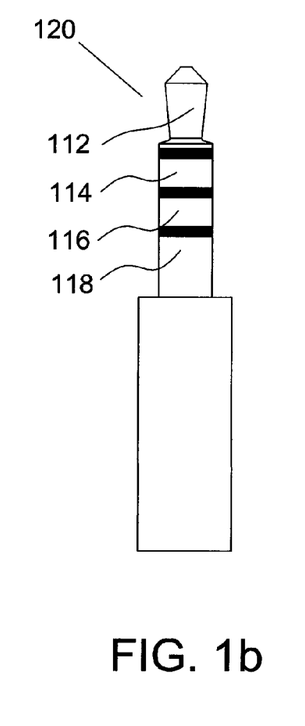
FIG. 1b is a standard plug with four contacts.

The electronic accessory, such as earphone or microphone connectable with an electronic device generally includes a 2.5 or 3.5 mm standard plug that is adapted to be inserted into an audio jack of the electronic device. Referring to FIGS. 1a and 1b, the standard audio plugs 110 and 120 include three or four contacts electrically isolated from each other. When the plug 110 or 120 is inserted into the audio jack of the electronic device, the contacts thereof will be in contact with the corresponding contact terminals of the audio jack. For example, a common earphone has a plug 110 of three contacts labeled from the tip to the end thereof in sequence as the contacts 112, 114 and 116, respectively. The contact 112 is adapted for the output of the audio left channel, the contact 114 is adapted for the output of the audio right channel, and the contact 116 is adapted for ground. In comparison with the above earphone, an earphone with microphone function has a plug 120 of four contacts 112, 114, 116, 118, and the additional contact 118 is adapted for audio input.

Figure 2:
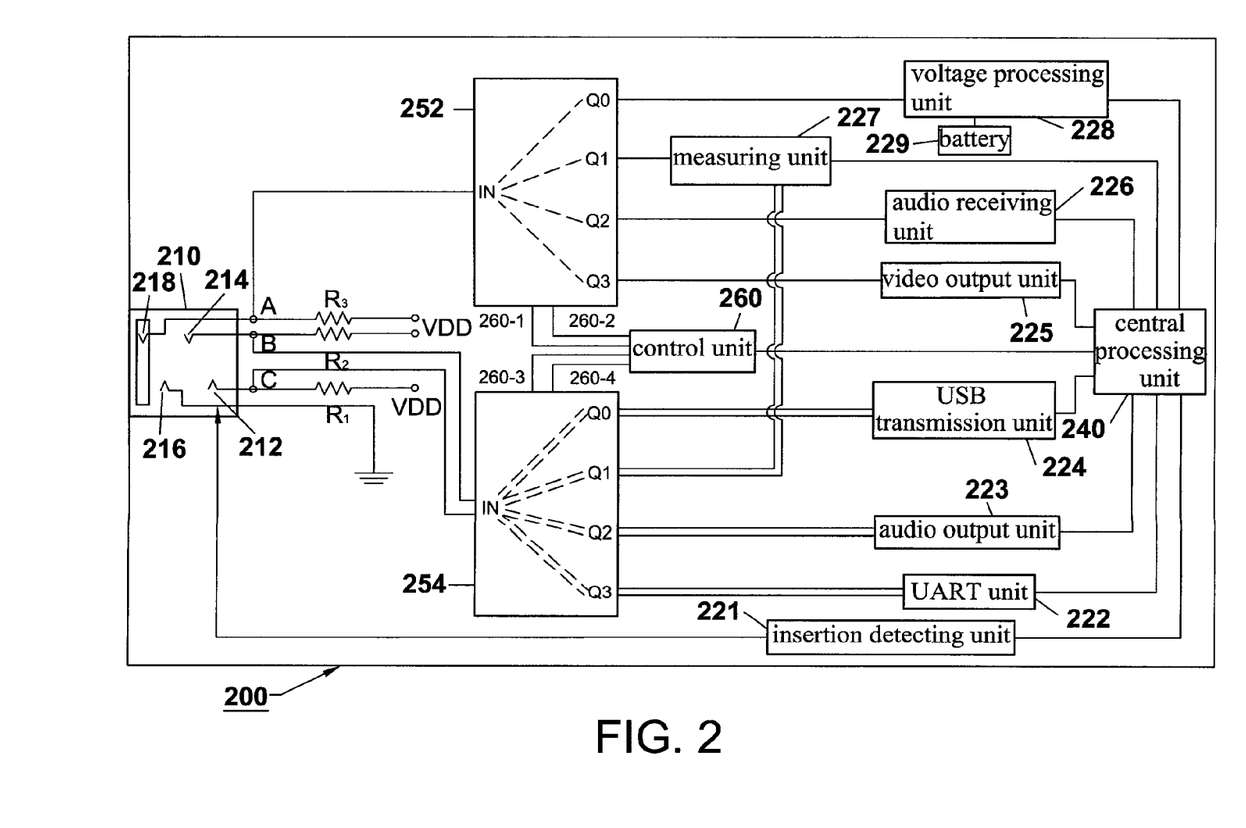
FIG. 2 is a schematic diagram of the electronic device of the present disclosure.

Referring to FIG. 2, the electronic device 200 of the present disclosure includes an audio jack 210 with four contact terminals 212, 214, 216 and 218. When the plug 120 of FIG. 1b is inserted into the audio jack 210, the contacts 112, 114, 116, 118 of the plug 120 will be in electrical contact with the contact terminals 212, 214, 216, 218 of the audio jack 210, respectively. In addition, when the plug 110 of FIG. 1a is inserted into the audio jack 210, the contacts 112 and 114 will be in electrical contact with the contact terminals 212 and 214 respectively, and the contact 116 will be in electrical contact with the contact terminals 216 and 218.

Figure 3A:
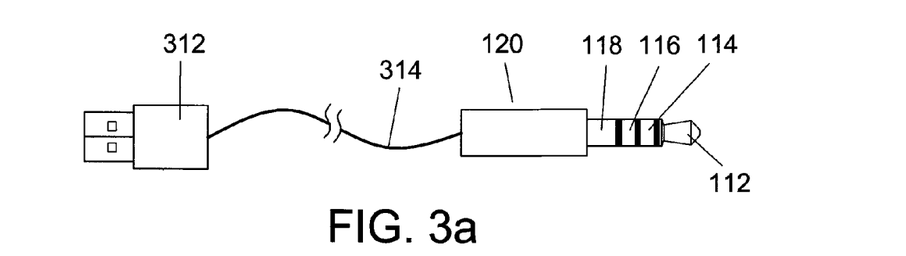
FIGS. 3a to 3d are the electronic accessories connectable with the electronic device of the present disclosure.
Figure 3B:
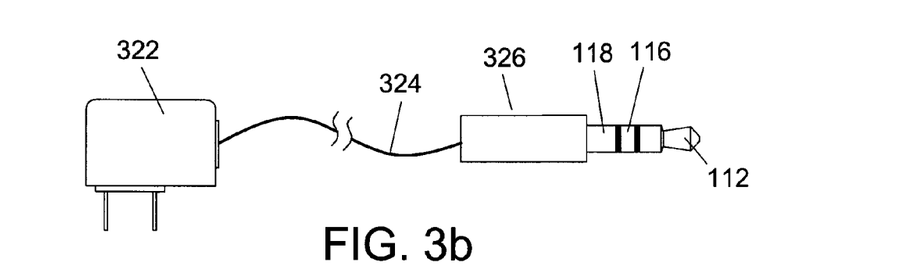

In order to have different accessories able to be inserted into the audio jack 210, one end of each the accessory is required to be equipped with a standard audio plug 110 or 120 of FIGS. 1a, 1b. For example, referring to FIG. 3a, a standard USB plug 312 is of square shape and has four terminals, i.e. USB_VBUS, USB_D+, USB D− and GND terminals. In this embodiment, the USB plug 312 is electrically connected to the plug 120 of FIG. 1b through a cable 314, wherein the USB_VBUS, USB_D+, USB D− and GND terminals are electrically connected to the contacts 112, 114, 116 and 118, respectively. Referring to FIG. 3b, an AC adapter 322 is a kind of device that may be plugged into a socket on a wall and then transform an AC power into a DC power to supply to the coupled electronic device. In this disclosure, the AC adapter 322 may be one that is in compliance with China's national standard definition and electrically connected to a plug 326 of three contacts through a cable 324. The plug 326 of three contacts is the same as the plug 120 of four contacts of FIG. 1b except that the contact 114 is shortly connected to the contact 112. That is to say, the plug 326 has only the contacts 112, 116 and 118. When the plug 326 is inserted into the audio jack 210 of the electronic device 200, the contact 112 of the plug 326 will be in contact with the contact terminals 212 and 214 of the audio jack 210. The AC adapter 322 has a positive (+) output terminal electrically connected to the contact 118 of the plug 326 and a negative (−) output terminal electrically connected to the contact 116.

Figure 3C:
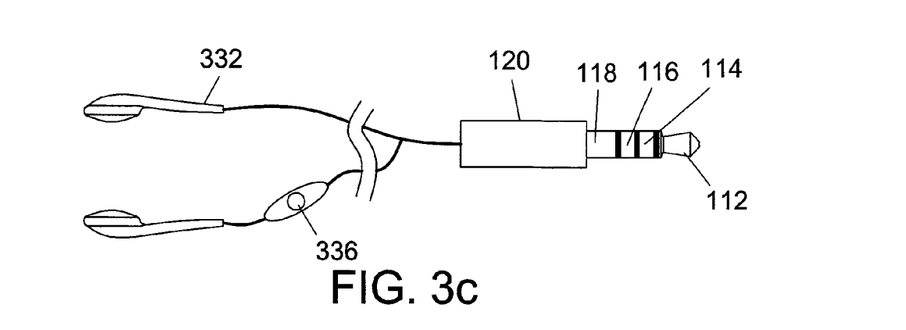

In addition, referring to FIG. 3c, an earphone 332 capable of answering a phone call includes a control button 336 and the plug 120 of four contacts of FIG. 1b. When the earphone 332 is coupled with a mobile phone through the plug 120, a press on the control button 336 may generate an interrupt signal to be transmitted from the contact 118 of the plug 120 to the mobile phone. Then a user may start a phone call. The microphone hidden in the control button 336 will be activated (not shown in the figure) and sound will emit from the earphone 332. When the control button 336 is pressed again, another interrupt signal will be transmitted to the mobile phone to hang up the phone.

Figure 3D:
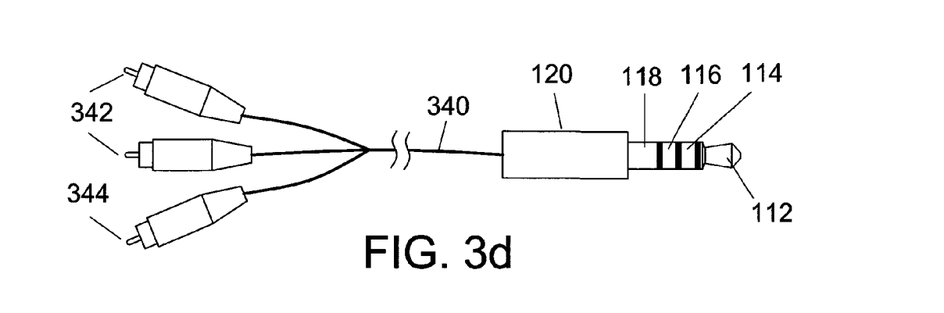

Referring to FIG. 3d, it shows a transmission cable 340 capable of simultaneously transmitting audio and video signals. The transmission cable 340 is equipped with the plug 120 of FIG. 1b. at one end thereof and with two audio plugs 342 and a video plug 344 at the other end. The video plug 344 is electrically connected to the contact 118 of the plug 120 and the two audio plugs 342 are electrically connected to the contacts 112 and 114, respectively. Furthermore, the plug 110 of FIG. 1a may also be devised to couple with a Universal Asynchronous Receiver/Transmitter (UART). The contact 112 of the plug 110 will be electrically connected to the transmitter of the UART and the contact 114 will be electrically connected to the receiver of the UART when the plug 110 is coupled with the UART.

Referring to FIG. 2 again, the electronic device 200 further includes an insertion detecting unit 221, five data transmission units 222, 223, 224, 225, 226, a measuring unit 227, a voltage processing unit 228, a battery 229, a central processing unit 240, two switching units 252, 254, such as multiplexers, and a control unit 260. In this disclosure, the data transmission units 222, 223, 224, 225, 226 are adapted to transmit to or receive from an electronic accessory a data signal through the contact terminals 212, 214, 218 of the jack 210 when a plug of the electronic accessory is inserted into the jack 210. All the data transmission units 222, 223, 224, 225, 226 are electrically connected to the central processing unit 240 and may be a UART unit 222, an audio output unit 223, a USB transmission unit 224, a video output unit 225 and audio receiving unit 226, respectively.

The switching unit 252 includes an input terminal IN and four output terminals Q0, Q1, Q2 and Q3. The input terminal IN is electrically connected to the contact terminal 218 of the audio jack 210, wherein the output terminal Q0 is electrically connected to the voltage processing unit 228, the output terminal Q1 is electrically connected to the measuring unit 227, the output terminal Q2 is electrically connected to the data transmission unit 226 and the output terminal Q3 is electrically connected to the data transmission unit 225. In addition, the switching unit 252 may be switched in such a manner that the element connected with the input terminal IN is electrically connected to one of the elements connected with the output terminals Q0, Q1, Q2 and Q3, respectively. Therefore, in the present disclosure, the switching unit 252 may selectively switch and electrically connect the contact terminal 218 connected with the input terminal IN to one of the voltage processing unit 228, measuring unit 227, data transmission unit 226 and data transmission unit 225 connected with the output terminals Q0, Q1, Q2 and Q3 respectively according to a selected signal 260-1 and a selected signal 260-2 outputted from the control unit 260.

The switching unit 254 includes two input terminals IN and eight output terminals, for example, two terminals Q0, two terminals Q1, two terminals Q2 and two terminals Q3, wherein the two input terminals IN are electrically connected to the contact terminals 212, 214 of the audio jack 210, respectively. The two output terminals Q0 are electrically connected to the data transmission unit 224, the two output terminals Q1 are electrically connected to the measuring unit 227, the two output terminals Q2 are electrically connected to the data transmission unit 223 and the two output terminals Q3 are electrically connected to the data transmission unit 222. Similarly, the switching unit 254 may also be switched in such a manner that the elements connected with the input terminals IN are electrically connected to one of the elements connected with the output terminals Q0, Q1, Q2 and Q3, respectively. Therefore, in the present disclosure, the switching unit 254 may selectively switch and electrically connect the contact terminals 212, 214 connected with the two input terminals IN respectively to one of the data transmission unit 224, measuring unit 227, data transmission unit 223 and data transmission unit 222 connected with four sets of the output terminals Q0, Q1, Q2 and Q3 respectively according to a selected signal 260-3 and a selected signal 260-4 outputted from the control unit 260.

When the plug 110 of FIG. 1a or the plug 120 of FIG. 1b is inserted into the audio jack 210, the contact 116 will be grounded since the contact terminal 216 is grounded. The contact 118 of the plug 120 will be in electrical connection with the input terminal IN of the switching unit 252 through the contact terminal 218. Similarly, the contacts 112 and 114 will be in electrical connection with the input terminal IN of the switching unit 254 through the contact terminals 212 and 214, respectively. Consequently, when the control unit 260 transmits the selected signals 260-1, 260-2 to the switching unit 252 to switch the output thereof to the terminal Q0, the input terminal IN will be in electrical connection with the output terminal Q0 and the contact 118 of the plug 120 or the contact 116 of the plug 110 will be in electrical connection with the voltage processing unit 228 through the contact terminal 218 accordingly. Similarly, when the switching unit 252 is switched in such a manner that the input terminal IN thereof is in electrical connection with the output terminal thereof Q1, Q2 or Q3 according to the selected signals 260-1, 260-2, the contact 118 of the plug 120 or the contact 116 of the plug 110 will be in electrical connection with the measuring unit 227, audio receiving unit 226 or video output unit 225 through the contact terminal 218. When the control unit 260 transmits the selected signals 260-3, 260-4 to the switching unit 254 to switch the output thereof to the terminal Q0, the two input terminals IN will be in electrical connection with the two output terminals Q0 respectively and the contacts 112, 114 of the plugs 110, 120 will be in electrical connection with the USB transmission unit 224 through the contact terminals 212, 214 respectively. Similarly, when the switching unit 254 is switched in such a manner that the input terminals IN are in electrical connection with the output terminals thereof Q1, Q2 or Q3 according to the selected signals 260-3, 260-4, the contacts 112, 114 of the plugs 110, 120 will be in electrical connection with the measuring unit 227, audio output unit 223 or UART unit 222.

Referring to FIG. 2 again, in order to identify what kind of electronic accessory is inserted into the audio jack 210, resistors $R_1$, $R_2$ and $R_3$ are connected to the contact terminals 212, 214 and 218 of the audio jack 210, respectively. It is to be noted that the contacts 112, 114, 118 of a plug of one kind of electronic accessory have the resistances that are different from the resistances of the contacts 112, 114, 118 of a plug of another different kind of electronic accessory, respectively. In other words, a plug of each kind of electronic accessory has the contacts 112, 114, 118 of specific resistances according to the present disclosure. For example, the resistances of the contacts 112, 114 and 118 are $R_A$, $R_B$ and $R_C$, respectively. When the plug 112 or 114 of an electronic accessory is inserted into the jack 210, the contact terminals 212, 214 and 218, i.e. the ends C, B and A of the resistors $R_1$, $R_2$ and $R_3$ will be in contact with the contacts 112, 114 and 118 of the plug 112 or 114, respectively. Consequently, the voltages to the ground applied at the ends C, B and A may be obtained according to the voltage division theorem and defined as $V_1$, $V_2$ and $V_3$ respectively, wherein $V_1$ is equal to $V_{DD} \times (Rc/(Rc+R_1))$, $V_2$ is equal to $V_{DD} \times (R_B/(R_B+R_2))$ and $V_3$ is equal to $V_{DD} \times (R_A/(R_A+R_B))$. In the embodiments of the present disclosure, an analog-to-digital converter (ADC) is used to function as the measuring unit 227 to measure the voltages $V_1$, $V_2$ and $V_3$ to the ground applied at the ends C, B, A of the resistor $R_1$, $R_2$ and $R_3$ and convert the measured voltages into digital values. These digital values are compared with the preset data stored in a memory of the electronic device 200 to identify what kind of electronic accessory is inserted into the audio jack 210 (not shown in the figure). The electronic device 200 then executes corresponding application programs or functions in accordance with the digital values. In another embodiment of the present disclosure, when the voltages to the ground applied at the ends C, B, A of the resistor $R_1$, $R_2$ and $R_3$, i.e. the voltages at the contact terminals 212, 214 and 218 of the jack 210 are $V_1$, $V_2$ and $V_3$ respectively, the resistances of the paths from the contacts 112, 114, 118 to the contact 116 i.e. grounded contact may be obtained and defined as $R_C$, $R_B$ and $R_A$ respectively, wherein $R_{Cc}$ is equal to $(R_1 \times V_1)/(V_{DD} - V_1)$, $R_B$ is equal to $(R_2 \times V_2)/(V_{DD} - V_2)$ and $R_A$ is equal to $(R_3 \times V_3)/(V_{DD} - V_3)$. Similarly, these obtained resistances $R_C$, $R_B$ and $R_A$ are then compared with the preset data stored in the memory of the electronic device 200 to identify what kind of electronic accessory is inserted into the audio jack 210 (not shown in the figure). In the embodiments of the present disclosure, the measuring unit 227 may be a 12-bit ADC with an output ranged from 0x000 to 0xFFF. The discussion on the electronic device and method thereof for identifying an electronic accessory according to the present disclosure is detailed in the following paragraphs.

The insertion detecting unit 221 of the electronic device 200 is in electrical connection with the central processing unit 240. The insertion detecting unit 221 is designed to detect whether the audio jack 210 is inserted with a plug of an electronic accessory every predetermined period of time, for example, 100 ms. When the insertion detecting unit 221 detects a plug is not inserted into the audio jack 210, the control unit 260 will generate and transmit the selected signal 260-1, 260-2, 260-3, 260-4, such as a digital signal "0000" to the central processing unit 240. The central processing unit 240 controls the switching units 252, 254 through the control unit 260 according to the selected signal so that the input terminals IN are in electrical connection with the output terminals Q0. More specifically, when the insertion detecting unit 221 detects a plug is not inserted into the audio jack 210, the switching unit 252 will electrically connect the contact terminal 218 of the audio jack 210 to the voltage processing unit 228 and the switching unit 254 will electrically connect the contact terminals 212, 214 of the audio jack 210 to the USB transmission unit 224.

In other embodiments, the insertion detecting unit 221 may be an interruption reactor. That is to say, there is no need for the insertion detecting unit 221 to detect an insertion of a plug every predetermined period of time. When there is a plug inserted into the audio jack 210, the interruption reactor will generate and transmit a signal to the central processing unit 240. In one embodiment, when the insertion detecting unit 221 detects an insertion of a plug of an electronic accessory into the audio jack 210, the voltage processing unit 228 will begin detecting whether a voltage is present at the contact terminal 218 of the audio jack 210. Therefore, when the voltage processing unit 228 detects a voltage being present at the contact terminal 218 of the audio jack 210, it is identified by the central processing unit 240 that the electronic accessory coupled with the audio jack 210 is the USB plug 312 of FIG. 3a or the AC adapter 322 of FIG. 3b that have been coupled with electrical power. Afterward, the USB transmission unit 224 begins detecting the voltages at the contact terminals 212, 214 of the audio jack 210. If the voltages at the contact terminals 212, 214 are equal, it is identified that the electrical power is provided by the AC adapter 322. The electrical power may charge the battery 229 of the electronic device 200 through the voltage processing unit 228. If the voltage at the contact terminal 214 is greater than that at the contact terminal 212, it is identified that the electrical power is provided by a computer through the USB plug 312. The electrical power may then charge the battery 229 through the voltage processing unit 228 and the USB transmission unit 224 transmits a signal to the central processing unit 240. The central processing unit 240 then executes a data synchronization program in accordance with the signal so that the electronic device 200 may begin a data share with the computer (not shown in the figure).

Furthermore, when the insertion detecting unit 221 detects an insertion of a plug of an electronic accessory into the audio jack 210 and if the voltage processing unit 228 detects a voltage is not present at the contact terminal 218 of the audio jack 210, the input terminal IN of the switching unit 252 is still in electrical connection with the output terminal Q0 and the two input terminals IN of the switching unit 254 are switched and electrically connected to the two output terminals Q1 so that the contact terminals 212, 214 of the audio jack 210 are switched from being in electrical connection with the USB transmission unit 224 to being in electrical connection with the measuring unit 227. When the parameter value measured at the contact terminals 212, 214 of the audio jack 210 by the measuring unit 227 is a first value, for example, 0xFFF, i.e. an open circuit state, it is identified by the central processing unit 240 that the electronic accessory is the AC adapter 322 or USB plug 312 that have not been coupled with electrical power yet. At this moment the input terminal IN of the switching unit 252 is still in electrical connection with the output terminal Q0 and the two input terminals IN of the switching unit 254 are switched from being in electrical connection with the two output terminals Q1 back to being in electrical connection with the two output terminals Q0. In other words, the contact terminals 212, 214 of the audio jack 210 are switched from being in electrical connection with the measuring unit 227 back to being in electrical connection with the USB transmission unit 224. Subsequently, when the AC adapter 322 or USB plug 312 are coupled with electrical power, the electrical power will begin charging the battery 229 through the voltage processing unit 228.

When the parameter value measured at the contact terminals 212, 214 of the audio jack 210 by the measuring unit 227 is within a second numeric range, the input terminal IN of the switching unit 252 is then switched to being in electrical connection with the output terminal Q1 and the two input terminals IN of the switching unit 254 are switched to being in electrical connection with the two output terminals Q2. In other words, the switching unit 252 switches the contact terminal 218 of the audio jack 210 from being in electrical connection with the voltage processing unit 228 to being in electrical connection with the measuring unit 227 and the switching unit 254 switches the contact terminals 212, 214 from being in electrical connection with the measuring unit 227 to the audio output unit 223. Afterward, the measuring unit 227 begins measuring a parameter resulted from the contact of the contact terminal 218 of the audio jack 210 with the contact of the plug so as to identify what kind of electronic accessory is inserted into the audio jack 210. The electronic device 200 then executes corresponding functions according to the parameter value measured at the contact terminal 218 of the audio jack 210 by the measuring unit 227.

Case 1: the Parameter Value Measured by the Measuring Unit 227 is 0xFFF

When the parameter value measured at the contact terminal 218 of the audio jack 210 by the measuring unit 227 is 0xFFF, i.e. an open circuit state, it is identified by the central processing unit 240 that the electronic accessory coupled with the audio jack 210 is the earphone 332 of FIG. 3c having the control button 336 and a plug of four contacts. Afterward, if the measured value changes to 0x000, i.e. a short circuit state, it may be identified that the control button 336 of the earphone 332 is pressed down. Subsequently, the input terminals IN of the switching units 252, 254 are all switched to being in electrical connection with the output terminals Q2 so that the contact terminal 218 of the audio jack 210 is in electrical connection with the audio receiving unit 226 and the contact terminals 212, 214 are in electrical connection with the audio output unit 223. The audio output unit 223 and audio receiving unit 226 are then activated and an audio data signal, such as voice data signal or music data signal is outputted from the audio output unit 223 to the earphone 332 through the contact terminals 212, 214. Furthermore, a user may use the microphone hidden in the control button 336 to input a voice data signal or music data signal to the audio receiving unit 226 through the contact terminal 218. Therefore, a user may press the control button 336 to activate the hidden microphone to answer a phone call when the electronic device 200 is a mobile phone. Afterward, a press on the control button 336 again will transmit an interrupt signal from the contact terminal 218 to the central processing unit 240. The central processing unit 240 then further transmits a signal to the audio receiving unit 226 and audio output unit 223 to inactivate them and hang up the phone according to the interrupt signal. At this moment the input terminal IN of the switching unit 252 is switched to being in electrical connection with the output terminal Q1 and the two input terminals IN of the switching unit 254 are still electrical connection with the output terminal Q2.

Case 2: the Parameter Value Measured by the Measuring Unit 227 is Within a Third Numeric Range When the parameter value measured at the contact terminal 218 of the audio jack 210 by the measuring unit 227 is within a third numeric range, it is identified by the central processing unit 240 that the electronic accessory coupled with the audio jack 210 is one similar to the earphone 332 of FIG. 3c that has a plug of four contacts and a microphone but no the control button 336. Afterward, the input terminal IN of the switching unit 252 is switched to being in electrical connection with the output terminal Q2 so that the contact terminal 218 of the audio jack 210 is switched from being in electrical connection with the measuring unit 227 to being in electrical connection with the audio receiving unit 226. The two input terminals IN of the switching unit 254 are still electrical connection with the output terminal Q2. At this moment the audio output unit 223 and audio receiving unit 226 are activated and an audio data signal is outputted from the audio output unit 223 to the earphone through the contact terminals 212, 214. A user may use the microphone to input an audio data signal to the audio receiving unit 226 through the contact terminal 218.

Case 3: the Parameter Value Measured by the Measuring Unit 227 is Within a Fourth Numeric Range When the parameter value measured at the contact terminal 218 of the audio jack 210 by the measuring unit 227 is within a fourth numeric range, it is identified by the central processing unit 240 that the electronic accessory coupled with the audio jack 210 is the transmission cable 340 of FIG. 3d that has a plug of four contacts and is adapted to output audio and video signals. Afterward, the input terminal IN of the switching unit 252 is switched to being in electrical connection with the output terminal Q3 so that the contact terminal 218 of the audio jack 210 is switched from being in electrical connection with the measuring unit 227 to being in electrical connection with the video output unit 225. The two input terminals IN of the switching unit 254 are still electrical connection with the output terminal Q2. At this moment the video output unit 225 and audio output unit 223 are activated to output a video data signal and an audio data signal respectively to an electronic device coupled with the plugs 342, 344 of the transmission cable 340, such as a television through the contact terminals 218, 212, 214.

Case 4: the Parameter Value Measured by the Measuring Unit 227 is 0x000

When the parameter value measured at the contact terminal 218 of the audio jack 210 by the measuring unit 227 is 0x000, i.e. a short circuit state, it is identified by the central processing unit 240 that the electronic accessory coupled with the audio jack 210 is an earphone with a plug of three contacts, for example, the plug 110 of FIG. 1a and without a microphone. Afterward, the audio output unit 223 is activated to output an audio data signal to the earphone through the contact terminals 212, 214.

Figure 4A:
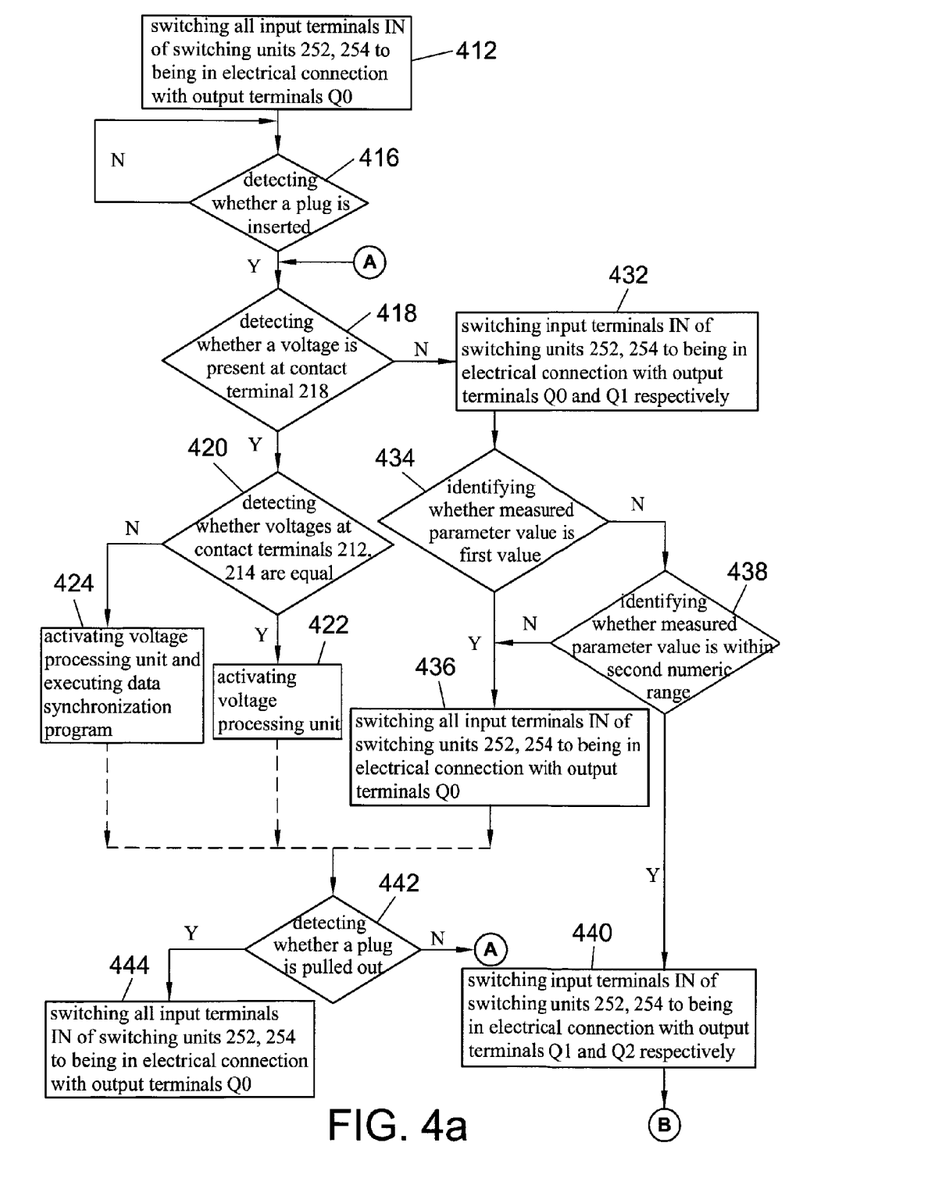
FIGS. 4a and 4b are flow charts illustrating the method of identifying an electronic accessory according to the present disclosure.
Figure 4B:
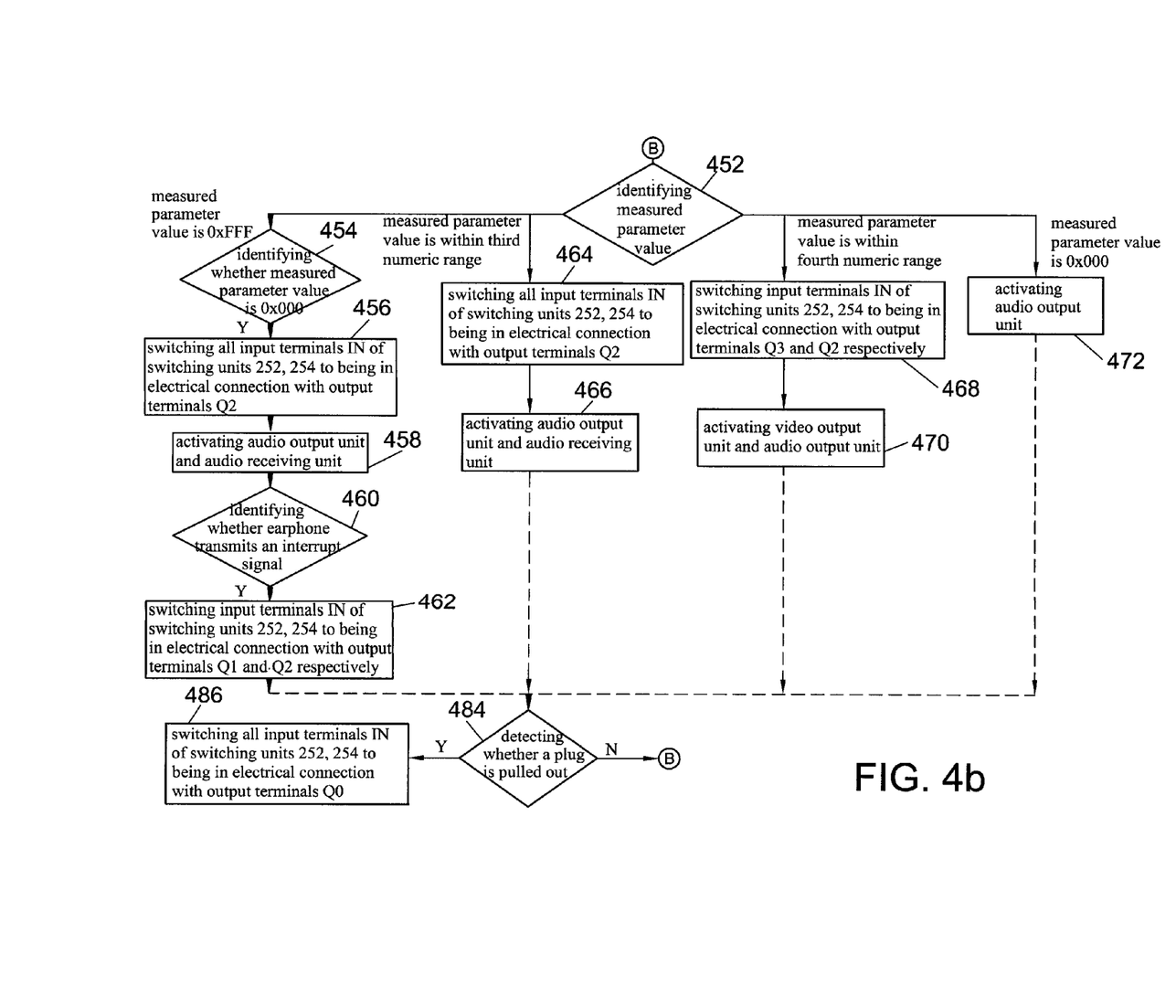

FIGS. 4a and 4b are flow charts illustrating the method of identifying an electronic accessory according to the present disclosure. Referring to FIGS. 2, 4a and 4b, first, the input terminals IN of the switching units 252, 254 are all switched to being in electrical connection with the output terminals Q0 (step 412) so as to detect whether the audio jack 210 is inserted with a plug (step 416) before the audio jack 210 is inserted with a plug of any electronic accessory. When the insertion detecting unit 221 detects a plug is not inserted into the audio jack 210, another detection will be made again after a predetermined period of time. When an insertion of a plug into the audio jack 210 is detected, the voltage processing unit 228 then detects whether a voltage is present at the contact terminal 218 of the audio jack 210 thereby identifying whether the electronic device 200 is provided with an electrical power (step 418). When the voltage processing unit 228 detects a voltage being present at the contact terminal 218, it then detects whether the voltages at the contact terminals 212, 214 are equal (step 420). If the voltages at the contact terminals 212, 214 are equal, it is identified that the electronic accessory coupled with the audio jack 210 is the AC adapter 322 of FIG. 3b that has been coupled with electrical power. Afterward, the voltage processing unit 228 is activated to charge the battery 229 (step 422). If the voltage at the contact terminal 214 is greater than that at the contact terminal 212, it is identified that the electronic accessory coupled with the audio jack 210 is the USB plug 312 of FIG. 3a that has been coupled with a computer. Afterward, the voltage processing unit 228 is activated to charge the battery 229 and the central processing unit 240 executes a data synchronization program (step 424).

When the voltage processing unit 228 detects a voltage is not present at the contact terminal 218, the input terminals IN of the switching units 252, 254 are switched to being in electrical connection with the output terminals Q0 and Q1 respectively (step 432) to identify whether the parameter value measured by the measuring unit 227 is the first value: 0xFFF (step 434). If the parameter value measured by the measuring unit 227 is 0xFFF, it is identified that the electronic accessory coupled with the audio jack 210 is the AC adapter 322 or USB plug 312 that have not been coupled with electrical power. Subsequently, the input terminals IN of the switching units 252, 254 are all switched to being in electrical connection with the output terminals Q0 (step 436) to wait for the coupling of the AC adapter 322 or USB plug 312 with electrical power. If the parameter value measured by the measuring unit 227 is not 0xFFF, the central processing unit 240 then identifies whether the parameter value measured by the measuring unit 227 is within a second numeric range (step 438). If the measured parameter value is not within the second numeric range, the input terminals IN of the switching units 252, 254 are all switched to being in electrical connection with the output terminals Q0. If the measured parameter value is within the second numeric range, the input terminals IN of the switching units 252, 254 are switched to being in electrical connection with the output terminals Q1 and Q2 respectively (step 440). It is to be noted that the insertion detecting unit 221 will continue to detect whether the plug of the electronic accessory is pulled out from the audio jack 210 after the plug has been inserted into the audio jack 210 (step 442). If the insertion detecting unit 221 detects a pulling out of the plug, the input terminals IN of the switching units 252, 254 are all switched back to being in electrical connection with the output terminals Q0 (step 444). If the insertion detecting unit 221 detects the plug is not pulled out, the procedure will go back to the step 418 where the voltage processing unit 228 detects whether a voltage is present at the contact terminal 218 of the audio jack 210.

Referring to FIG. 4b, afterward, the measuring unit 227 measures a parameter resulted from the contact of the contact terminal 218 of the audio jack 210 with the contact of the plug and the central processing unit 240 identifies and compares the measured parameter value with the preset data stored in the memory (step 452). 1) When the parameter value measured by the measuring unit 227 is 0xFFF, it is identified that the electronic accessory coupled with the audio jack 210 is the earphone 332 of FIG. 3c with the control button 336 and a plug of four contacts. Subsequently, the central processing unit 240 identifies whether the measured value changes to 0x000 (step 454). If yes, it may be identified that the control button 336 of the earphone 332 is pressed down. At this moment the input terminals IN of the switching units 252, 254 are all switched to being in electrical connection with the output terminals Q2 (step 456), and the audio receiving unit 226 and audio output unit 223 of the electronic device 200 are activated for a user to answer a phone call (step 458). If the user presses the control button 336 again to transmit an interrupt signal, the phone may be hung up (step 460). The input terminals IN of the switching units 252, 254 will then be switched to being in electrical connection with the output terminals Q1 and Q2 respectively (step 462).

2) When the parameter value measured by the measuring unit 227 is within a third numeric range, it is identified that the electronic accessory coupled with the audio jack 210 is one similar to the earphone 332 of FIG. 3c that has a plug of four contacts and a microphone but no the control button 336. Afterward, the input terminals IN of the switching units 252, 254 are all switched to being in electrical connection with the output terminals Q2 (step 464). The audio output unit 223 and audio receiving unit 226 of the electronic device 200 are activated to transmit an audio data signal to the earphone and receive an audio data signal from the microphone (step 466).

3) When the parameter value measured by the measuring unit 227 is within a fourth numeric range, it is identified that the electronic accessory coupled with the audio jack 210 is the transmission cable 340 of FIG. 3d that has a plug of four contacts and is adapted to output audio and video signals. Afterward, the input terminals IN of the switching units 252, 254 are switched to being in electrical connection with the output terminals Q3 and Q2 respectively (step 468). The video output unit 225 and audio output unit 223 of the electronic device 200 are activated to output a video data signal and an audio data signal respectively (step 470).

4) When the parameter value measured by the measuring unit 227 is 0x000, it is identified that the electronic accessory coupled with the audio jack 210 is an earphone with a plug of three contacts, for example, the plug 110 of FIG. 1a and without a microphone. Afterward, the audio output unit 223 is activated to output an audio data signal to the earphone through the contact terminals 212, 214 (step 472). Similarly, it is to be noted that the insertion detecting unit 221 will continue to detect whether the plug of the electronic accessory is pulled out from the audio jack 210 after the plug has been inserted into the audio jack 210 (step 484). If the insertion detecting unit 221 detects a pulling out of the plug, the input terminals IN of the switching units 252, 254 are all switched back to being in electrical connection with the output terminals Q0 (step 486). If the insertion detecting unit 221 detects the plug is not pulled out, the procedure will go back to the step 452.

It should be noted that in addition to by measuring the parameter value, a user may also tell the electronic device 200 which electronic accessory is coupled with by selecting an item from the accessory menu provided by an application program executed in the electronic device 200 according to other embodiments of the present disclosure. For example, when the coupled electronic accessory is a UART accessory, the user may select the UART item from the accessory menu. Afterward, the input terminals IN of the switching unit 254 are switched to being in electrical connection with the output terminals Q3 to electrically connect the UART accessory to the UART unit 222 thereby carrying out an asynchronous receiving and transmission between the electronic device 200 and UART accessory.

It should be noted that the electronic device 200 of the present disclosure may be a mobile phone, smart phone, personal digital assistant phone (PDA), MP3 player or one with a standard 2.5 or 3.5 mm audio jack.

Although the voltages at the contact terminals 212, 214, 218 of the audio jack 210 are measured to determine what functions should be executed according to the present disclosure, it will be appreciated that other parameter, such as resistance or current may also be measured to determine the functions to be executed. These parameters, including the voltage, resistance and current measured at the contact terminals 212, 214, 218 of the audio jack 210 are all dependent upon the resistances of the contacts of the plug of the electronic accessory. In brief, the voltage, resistance or current measured at the contact terminals 212, 214, 218 will be different thereby determining what functions should be executed when a plug of a different kind of electronic accessory is inserted into the audio jack 210.

Furthermore, although the exemplary examples given above are illustrated in two switching units 252, 254, it should be appreciated that the use of only one switching unit may still achieve the present disclosure.

According to the method of the present disclosure, the parameter, such as voltage, resistance or current may be measured to identify what kind of electronic accessory is inserted into the audio jack. Accordingly, the object of coupling various kinds of electronic accessories with the electronic device to execute the functions thereof may still be achieved by equipping with only one audio jack. Furthermore, the switching unit is switched in such a manner that the contact terminals of the audio jack are in electrical connection with the voltage processing unit and USB transmission unit 224 before the audio jack is inserted with a plug. This may protect other elements in the electronic device from an electrical surge when an AC adapter or USB plug coupled with electrical power is inserted into the audio jack of the electronic device.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An electronic device connectable with an electronic accessory, the electronic accessory having a plug, the electronic device comprising:
   a jack configured to receive an insertion of the plug, having at least one first contact terminal and a second contact terminal that are configured to be in contact with at least one first contact and a second contact of the plug, respectively;
   a voltage processing unit configured to detect whether a voltage is present at the second contact terminal of the jack when the second contact of the plug is in contact with the second contact terminal of the jack;
   a measuring unit configured to measure a first parameter resulted from a contact of the first contact terminal of the jack with the first contact of the plug and to measure a second parameter resulted from a contact of the second contact terminal of the jack with the second contact of the plug;
   an audio output unit configured to output a first audio data signal to the electronic accessory through the first contact terminal of the jack when the jack receives the insertion of the plug;
   an audio receiving unit configured to receive a second audio data signal from the electronic accessory through the second contact terminal of the jack when the jack receives the insertion of the plug;

a switching unit configured to selectively connect the first contact terminal of the jack electrically to the audio output unit or the measuring unit according to whether the voltage is present or not, and configured to selectively connect the second contact terminal of the jack electrically to the audio receiving unit, the voltage processing unit or the measuring unit; and a battery electrically connected to the voltage processing unit;

wherein upon the voltage processing unit detecting that the voltage is present at the second contact terminal of the jack, the voltage processing unit is configured to charge the battery; otherwise, the switching unit is configured to connect the first contact terminal of the jack electrically to the measuring unit for measuring the first parameter and to connect the second contact terminal of the jack electrically to the voltage processing unit;

wherein, when the first parameter measured by the measuring unit has a first predetermined value, the first contact terminal of the jack is switched by the switching unit from being in electrical connection with the measuring unit to being in electrical connection with the audio output unit and the second contact terminal of the jack is switched by the switching unit from being in electrical connection with the voltage processing unit to being in electrical connection with the measuring unit so that the measuring unit measures the second parameter; and wherein, when the second parameter measured by the measuring unit has a second predetermined value, the first contact terminal of the jack is kept in electrical connection with the audio output unit and the second contact terminal of the jack is switched by the switching unit from being in electrical connection with the measuring unit to being in electrical connection with the audio receiving unit for receiving the second audio data signal.

2. The electronic device as claimed in claim 1, further comprising:

an insertion detecting unit configured to detect whether the plug of the electronic accessory is inserted into the jack, wherein the voltage processing unit is configured to detect whether the voltage is present or not when the insertion detecting unit detects the insertion of the plug into the jack.

3. The electronic device as claimed in claim 2, wherein the switching unit is configured to connect the second contact terminal of the jack electrically to the voltage processing unit when the insertion detecting unit detects the plug is not inserted into the jack.

4. The electronic device as claimed in claim 1, further comprising:

a video output unit configured to output a video data signal through the second contact terminal of the jack, wherein the switching unit is configured to switch the second contact terminal of the jack from being in electrical connection with the measuring unit to being in electrical connection with the video output unit when the second parameter measured by the measuring unit has a third predetermined value.

5. The electronic device as claimed in 4, wherein the first predetermined value, the second predetermined value and the third predetermined value are different one from another.

6. A method of identifying an electronic accessory for an electronic device, the electronic device comprising a voltage processing unit, a measuring unit, a battery, an audio output unit, an audio receiving unit and a jack configured to receive an insertion of a plug of the electronic accessory, the jack having at least one first contact terminal and one second contact terminal, the method comprising:

detecting whether a voltage is present at the second contact terminal of the jack by the voltage processing unit; and upon the voltage processing unit detecting that the voltage is present at the second contact terminal of the jack, charging the battery; otherwise, electrically connecting the first contact terminal of the jack to the measuring unit, electrically connecting the second contact terminal of the jack to the voltage processing unit, and measuring a first parameter resulted from a contact of the first contact terminal of the jack with a first contact of the plug of the electronic accessory by the measuring unit;

when the first parameter measured by the measuring unit has a first predetermined value, switching the first contact terminal of the jack from being in electrical connection with the measuring unit to being in electrical connection with the audio output unit for outputting a first audio data signal, switching the second contact terminal of the jack from being in electrical connection with the voltage processing unit to being in electrical connection with the measuring unit, and measuring a second parameter resulted from a contact of the second contact terminal of the jack with a second contact of the plug by the measuring unit; and when the second parameter measured by the measuring unit has a second predetermined value, keeping the first contact terminal of the jack being in electrical connection with the audio output unit, switching the second contact terminal of the jack from being in electrical connection with the measuring unit to being in electrical connection with the audio receiving unit for receiving a second audio data signal.

7. The method as claimed in claim 6, further comprising:

detecting whether the plug of the electronic accessory is inserted into the jack; and detecting whether the voltage is present or not by the voltage processing unit when the insertion of the plug into the jack is detected.

8. The method as claimed in claim 7, further comprising:

electrically connecting the second contact terminal of the jack to the voltage processing unit when the insertion of the plug into the jack is not detected.

9. The method as claimed in claim 6, wherein the first predetermined value and the second predetermined value are different from each other.

* * * * *